June 20, 1933.  F. E. FAIRCHILD  1,914,414
SYSTEM FOR MEASURING TRANSMISSION AT VARIOUS FREQUENCIES
Filed Dec. 17, 1931
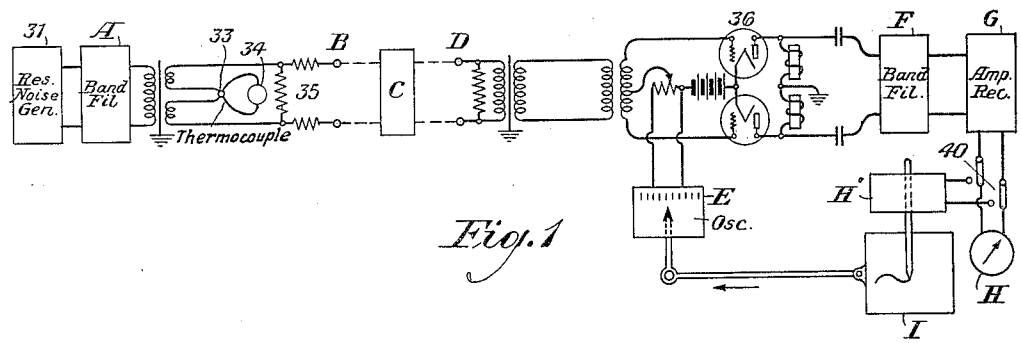
*Fig. 1*
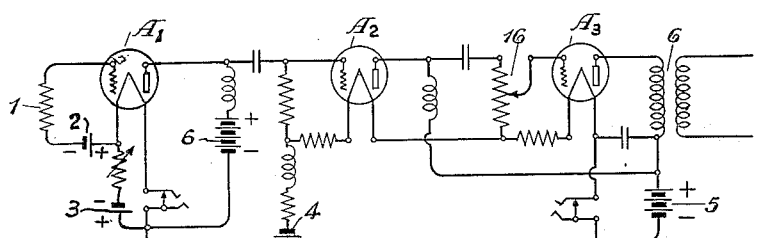
*Fig. 2*
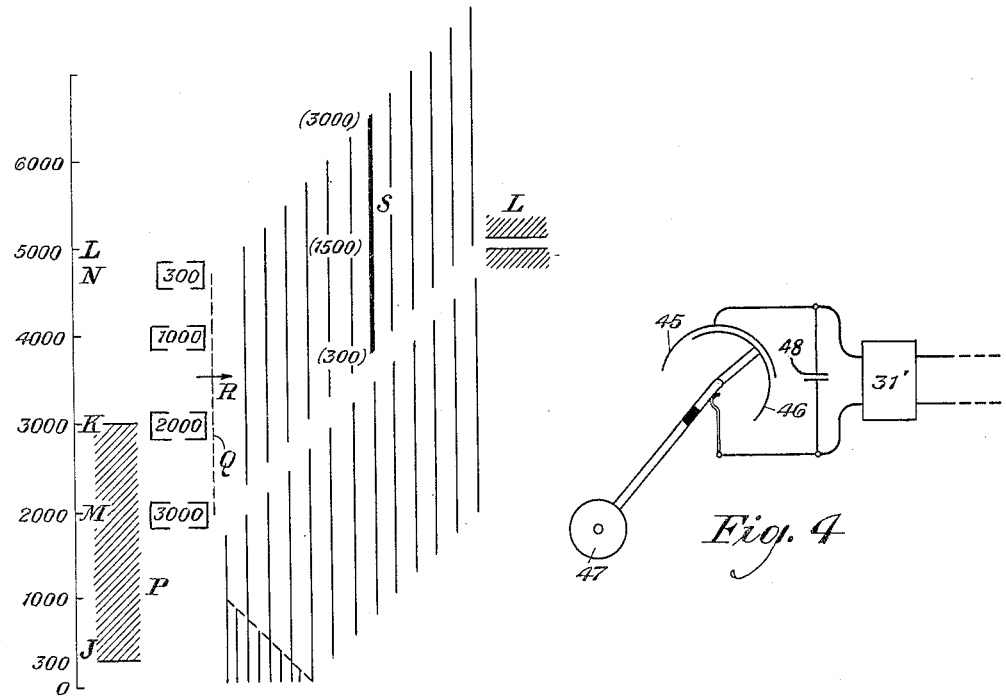
*Fig. 3*
*Fig. 4*
INVENTOR
F.E.Fairchild
BY
ATTORNEY Patented June 20, 1933

1,914,414

UNITED STATES PATENT OFFICE

FRANK E. FAIRCHILD, OF SUMMIT, NEW JERSEY, ASSIGNOR TO AMERICAN TELEPHONE AND TELEGRAPH COMPANY, A CORPORATION OF NEW YORK

SYSTEM FOR MEASURING TRANSMISSION AT VARIOUS FREQUENCIES

Application filed December 17, 1931. Serial No. 581,737.

Among the objects of my invention is to provide a new and improved method and corresponding apparatus for measuring the transmission through a transducer at each of a variety of frequencies within a desired frequency range. Another object of my invention is to provide such method and apparatus using a composite input source and making all adjustments for different frequencies on the output side of the transducer. Still another object of my invention is to provide for measuring transmission at each of a variety of frequencies using a composite current source determined by amplification from the fluctuating electromotive force due to thermal agitation in a resistance. Still another object is to provide for adjustment in this connection by stepping the received currents up or down in frequency by means of a modulator, and separating out the part corresponding to the part to be measured by means of a narrow band filter, and adjusting this part by adjusting the basic frequency of the modulator. All these objects and other objects and advantages of my invention will be made apparent in the following specification and claims taken in connection with the accompanying drawing. In this specification I have chosen for disclosure one specific example of practice according to my invention. It will be understood that the following description relates principally to this particular example of the invention and that the scope of the invention will be indicated in the appended claims.

Referring to the drawing, Figure 1 is a diagram of a system with which my invention may be practiced; Fig. 2 is a diagram of the resistance noise generator shown symbolically at 31 in Fig. 1; Fig. 3 is a diagram showing frequency levels for the system of Fig. 1, particularly in connection with the oscillator E and the band filter F; and Fig. 4 is a diagram of an alternative composite current generator that may be used alternatively with the device 31 in Fig. 1.

In Fig. 1 the symbol C represents any transducer whose transmission is to be measured at each of various frequencies. For example, the transducer C may be a transmission line extending between the sending terminals B at the left and the receiving terminals D at the right.

At the sending end a resistance noise generator 31 is provided. The form that this may take will be explained presently in connection with Fig. 2. It delivers a composite current, the components being at all different frequencies over a wide range of frequencies, and within this range the components are at approximately the same power level. This composite current from the resistance noise generator 31 goes through the band filter A which cuts off the components lying outside the frequency range with which we are concerned. At 33 a thermo-couple, and at 34 a meter by which the output current from the band filter A can be measured, and at 35 there is an adjustable network by which the output to the sending terminals B can be adjusted according to the indication given by the meter 34. Thus the current applied at the sending terminals B may be adjusted to be of definite power level.

This composite current of different frequency components goes through the transducer C from the sending terminals B to the receiving terminals D, and is there received and amplified and applied to the modulator whose basic frequency is generated by the adjustable oscillator E. The balanced tubes of the demodulator are represented at 36, and the output therefrom goes to the band pass filter F, and its output goes through the amplifier-rectifier G and thence to the meter H.

The generator 31 and the other apparatus at the sending end determine that a composite current of substantially uniform power level at all frequencies is applied to the sending terminals between the limiting frequencies of the band filter A. Suppose we are interested in the transmission of voice frequency components and that these limiting frequencies of the filter A are 300 cycles per second and 3,000 cycles per second. In general, let these limiting frequencies be J and K respectively. This frequency range is indicated by the shaded band P at the left of Fig. 3, and these are the frequencies transmitted over the transducer C. But the transducer C may attenuate these frequencies in different degrees and it is these different degrees of attenuation at the various frequencies that are to be determined at the receiving end.

The oscillator E delivers a single frequency of current adjustable with uniform power from 2,000 cycles per second to 4,700 cycles. In general, let this frequency range be from M cycles to N cycles per second. These frequencies are noted on the vertically extending scale at the left of Fig. 3. Assume that the oscillator E is adjusted to the particular frequency, 3,500 cycles, in general R cycles, as indicated by the arrow R lying across the dotted line Q, which indicates the range of values for R. Accordingly, the upper side band from the modulator 36 will range from 3,500+300 cycles per second up to 3500+3000 cycles per second. That is, from 3800 to 6500. The heavily shaded vertical line in Fig. 3 indicates this frequency range and adjacent numerals in parentheses indicate the corresponding parts of the initial band P.

The band filter F in Fig. 1 passes a narrow band of width say for example 20 cycles, and of mean frequency 5,000 cycles per second. In general, let this value be L. It is indicated at L in Fig. 3. Accordingly, the part of the band S that is passed at L is the part based on 1500 cycles in the initial band P. In general, this part of the band will be of frequency $L-R$, and when R takes the extreme values N and M, we have $L-N=J$ and $L-M=K$, or in this particular case, $5000-4700=300$ and $5000-2000=3000$.

The oscillator E is adjustable over its range from M or 2,000 cycles to N or 4,700 cycles as may be visualized by carrying arrow R up and down on the vertical line Q in Fig. 3. The arrow R may be thought of as carrying the band or range indicated by S up and down with it, thus bringing various parts of the band S opposite the stationary narrow band pass filter represented at level L. As the arrow R goes up it brings parts of the band S opposite L that correspond to lower and lower frequencies on the scale at P. The range of displacement for the arrow R along the line Q is calibrated with the numerals in square brackets and the position of the arrow R in respect to these numerals gives the frequency on the scale at P corresponding to the frequency that is passed through the narrow band pass filter at L. At the particular adjustment of R shown in Fig. 3, the oscillator is delivering 3,500 cycles per second and the narrow band pass filter at L is always passing 5,000 cycles per second, but at this adjustment, the part of the band S which said filter passes corresponds to 1,500 cycles at modulator input.

Accordingly, having started the system in operation at the sending end, no further adjustment is needed there, but the oscillator E at the receiving end is adjusted to various frequencies represented on the scale at the left between M and N, and at each adjustment the corresponding intensity is read off on the meter H. In this way, without any adjustment at the sending end, a table of intensities or transmission values at and near various frequencies will be obtained at the receiving end.

In the measurement of transmission values with various frequencies at the sending end, one method practiced heretofore has been to measure the gain in an amplifier to bring the received current up to a standard value indicated on a meter. It is somewhat difficult to make an amplifier that will give uniform gain over a wide range of frequencies. This difficulty is obviated according to my invention by making the adjustment in an oscillator as at E in Fig. 1, and in my system the amplifier G amplifies only a very narrow band of frequencies always at one mean frequency, namely, L cycles or 5,000 cycles in the illustration that has been used heretofore.

The adjusting element of the oscillator E may be connected directly with the recording sheet I, and a recording stylus operated from a metering device H' may record directly on the recording sheet I. The switches 40 serve to disconnect meter H and connect metering device H'. The stylus controlled by H' will be moved up and down by H' to correspond with the indications on the meter H. The record sheet I will be moved to correspond with the adjustment of the oscillator E, and thus the system shown at the receiving end in Fig. 1 may be operated by manual adjustment in a single dimension to get a continuous record of the transmission plotted against frequency values.

The source of composite current with components at various frequencies indicated at 31 at the left of Fig. 1 may be constructed as shown in Fig. 2 where $A_1$, $A_2$ and $A_3$ are stages of an amplifier suplied with a fluctuating electromotive force on the grid of the tube $A_1$ from the resistance 1. That is, the thermal agitation of the molecules and bound electrons and free electrons in the resistance 1 puts a fluctuating electromotive force on the grid of the tube $A_1$ and this is amplified in stages to give a corresponding fluctuating output current at 6 from the last tube $A_3$. Adjustment may be made at the potentiometer 16 to get the output at the proper power level. The input electromotive force and the corresponding output current will comprise component currents of all frequencies from zero up to a high value, and within the range of the band filter A in Fig. 1 these components will be of substantially uniform power. Separate batteries 2, 3 and 6 for the grid, filament heating and plate circuits, respectively, of tube $A_1$ are provided so that battery noise will complicate the operation as little as possible. For the remaining tubes, the grid voltage and the filament heating current are derived from the battery 4, and the battery 5 is provided for the plate circuits. The composite current from the generator of Fig. 2 goes through the repeating coil 6 to the input of the band filter A in Fig. 1.

An alternative composite current source is shown in Fig. 4. This may be connected in Fig. 1 in lieu of the unit 31. In Fig. 4 the oscillation generator 31' has the variable condenser of its frequency determining circuit composed of the stationary plate 45 and the rotating plate 46, driven by the motor 47. The variable condenser is shunted by a fixed condenser 48. Thus the oscillator 31' delivers a range of frequencies as the capacity of the variable condenser is changed rapidly from its minimum to its maximum capacity and back. By correctly proportioning the capacities of the fixed condenser 48 and the variable condenser formed by the plates 45 and 46, the frequency range may be made to cover a wide range or narrow band, as desired. In this way this oscillator may be regarded as a source of composite current comprising a variety of frequencies.

I claim:

1. The method of measuring transmission in each of a plurality of narrow frequency bands, which consists in transmitting a composite current of different frequencies, modulating the received current with a certain basic frequency, filtering to pass a narrow frequency range of the modulated current, measuring the filtered current, and adjusting the said basic frequency to different values to get the transmission at the desired corresponding values of the input current.

2. The method of measuring transmission at and near a particular frequency, which consists in transmitting a composite current of a wide range of frequencies including the desired frequency, modulating the received current with a certain basic frequency, filtering to pass a narrow frequency band of the modulated current, measuring the filtered current and adjusting the said basic frequency so that the portion of the frequency band of modulated current that is filtered will correspond to the desired initial frequency to be measured.

3. The method of measuring transmission at a particular frequency, which consists in transmitting a range of frequencies comprising this particular frequency, beating the received current with a current of a particular frequency, filtering the resultant current to pass a narrow range of frequencies, and adjusting the beating current to make the filtered current correspond to that for which the measurement is desired.

4. The method of measuring transmission through a transducer at and near each of several different particular frequencies within a certain frequency range which consists in generating a composite current of a wide range of frequencies including the desired frequencies and at substantially uniform power level for all the component frequencies within the part of the range including said particular frequencies, filtering said current to exclude frequencies outside said range, transmitting the filtered current through the transducer, modulating the received current therefrom with a certain basic frequency, filtering the modulated current to pass a narrow frequency band in one of its side bands, measuring this filtered current, and adjusting the said basic frequency of the modulator so that the filtered band of current will correspond to the desired initial frequencies to be measured.

5. The method of measuring transmission through a transducer at and near a desired particular frequency which consists in transmitting currents of a considerable range of frequencies comprising this desired frequency, modulating the received current, filtering out a narrow band of the modulated current, and adjusting the basic frequency of the modulator to make the said filtered current correspond with the desired frequency.

6. The method of recording transmission at various frequencies through a transducer which consists in modulating all the current from the transducer, passing a narrow frequency band from the modulator, metering this band, and recording the meter output on a surface which is moved by adjustment of the basic frequency of modulation to get a continuous record at all frequencies.

7. The method of measuring transmission at and near a particular frequency which consists in generating a fluctuating electromotive force from the thermal agitation in a resistance, amplifying to get a corresponding fluctuating current, transmitting this current, modulating the received current with a basic frequency, filtering a narrow band of current from the modulator, and measuring the filtered current.

8. In combination, a source of composite current of various frequencies, a transducer through which said current is passed, a modulator to which the output current from the transducer is applied, an adjustable oscillation generator to supply current of basic frequency to said modulator, a narrow band pass filter for the output from the modulator, and a meter for the output of said filter.

9. In combination, a resistance noise generator, an amplifier to give a corresponding current, a band filter to pass a desired frequency range of said current, a transducer through which the filtered current is passed, a modulator to which the received current is applied, an adjustable oscillation generator to supply current of basic frequency to the modulator, a narrow band-pass filter for the modulator output, and a meter for the filtered current.

10. A combination according to claim 9 with a recording surface, means to move it in one direction to correspond with adjustment of said oscillation generator, and a recording stylus on said surface moved in a transverse direction by said meter.

11. In a system for the measurement of transmission through a transducer, means to put a composite current of various frequencies over a certain range into the transducer, a modulator to which the received current from the transducer is applied, an adjustable oscillation generator to supply the basic current of the modulator, a narrow band-pass filter for the output current from the modulator, and a meter for the filtered current.

12. In combination, a resistance noise generator, an amplifier to give a corresponding current, a band filter to pass a desired frequency range of said current, a transducer through which the filtered current is passed, a narrow band-pass filter at the output end of the transducer, and means to make a relative adjustment between the mean frequency of said filter and the range of the frequencies on the input side of said filter.

13. In a system for the measurement of transmission through a transducer, means to put a composite current of various frequencies over a certain range into the transducer, a narrow band-pass filter having its input operatively connected with the transducer output, and means to adjust the frequencies applied at the filter input relatively to the frequencies passed by the filter.

14. The method of measuring the transmission gain or loss of a transducer at any and all frequencies within a frequency band which consists in generating a composite current, impressing the composite current on the input of the transducer, applying to the output of the transducer a source of current of variable frequency, varying the frequency of the latter source, and modulating the received composite current with the current of the oscillator to determine the gain or loss of the transducer.

In testimony whereof, I have signed my name to this specification this 15th day of December, 1931.

FRANK E. FAIRCHILD.